Figure 2:
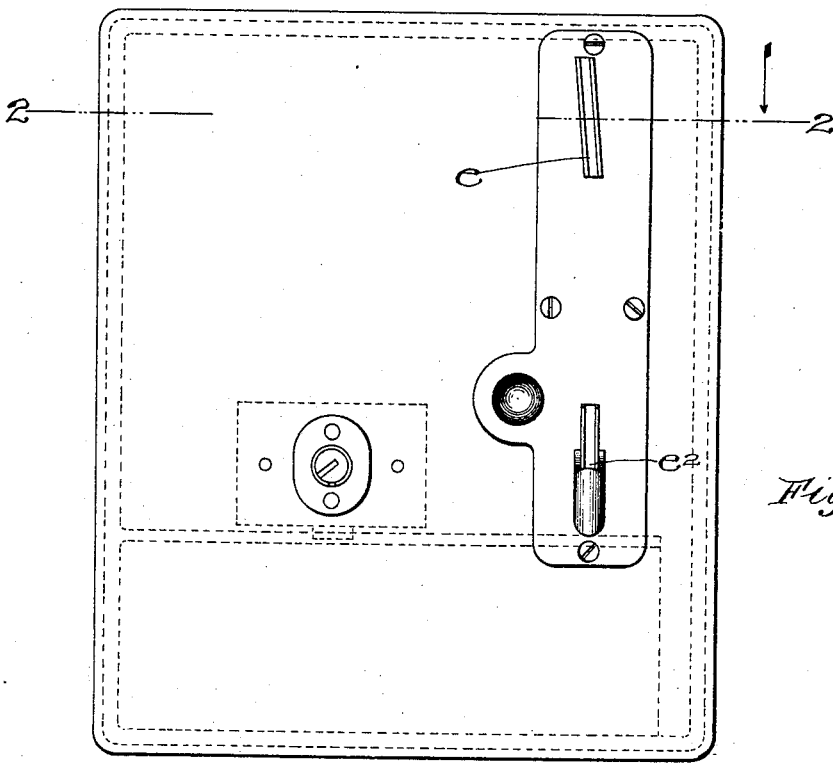

No. 771,920. PATENTED OCT. 11, 1904.
F. R. McBERTY.
COIN COLLECTOR.
APPLICATION FILED JAN. 23, 1903.
NO MODEL. 5 SHEETS—SHEET 1.
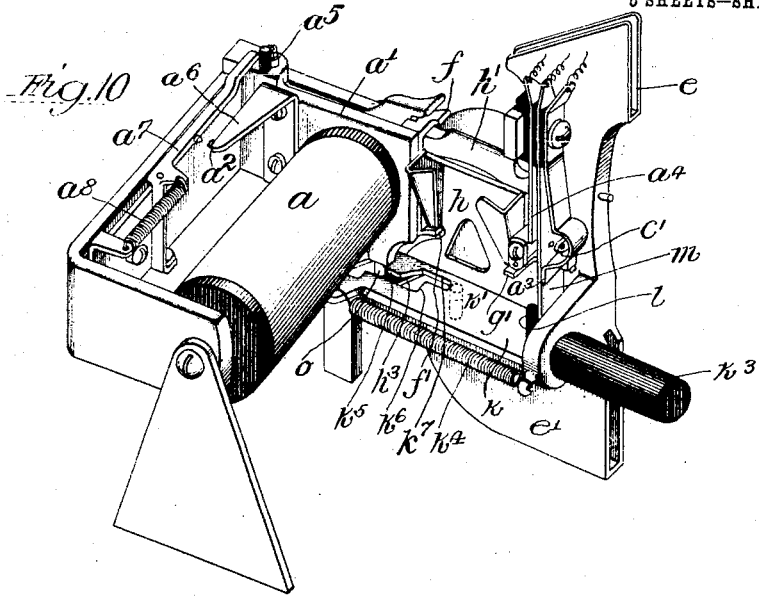
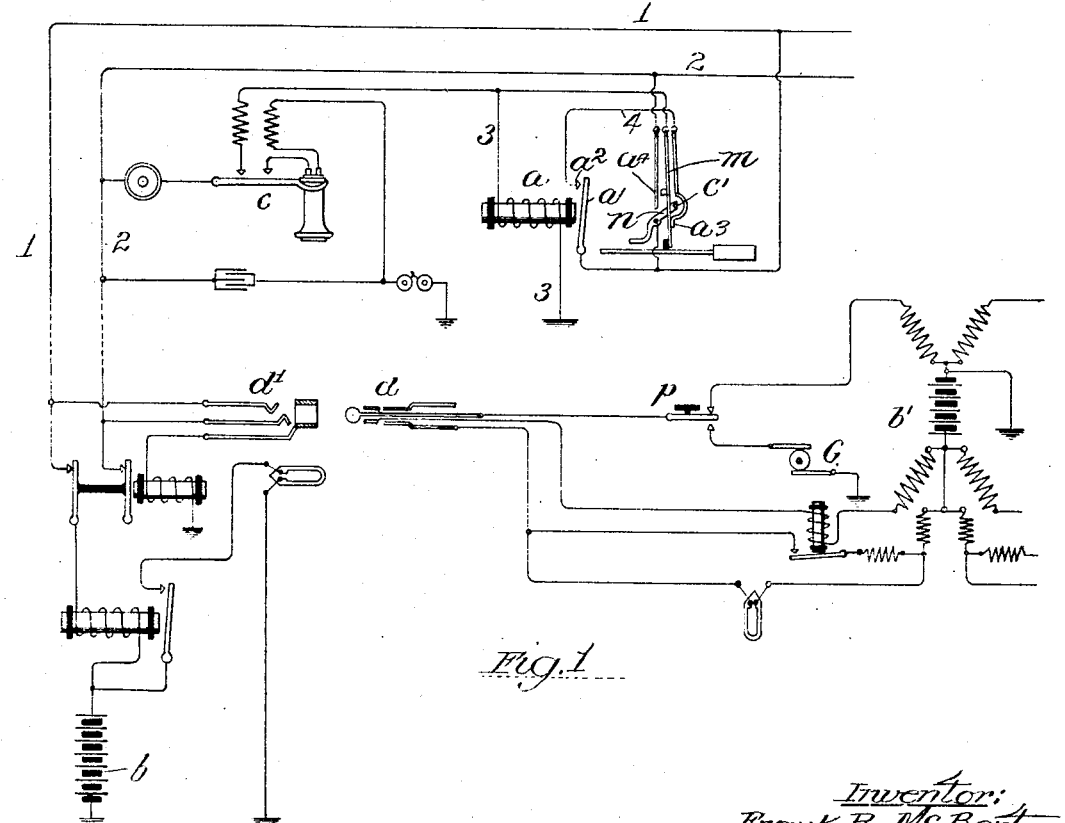

No. 771,920. PATENTED OCT. 11, 1904.
F. R. McBERTY.
COIN COLLECTOR.
APPLICATION FILED JAN. 23, 1903.
NO MODEL.
5 SHEETS—SHEET 2.

Witnesses:
J. H. Skinkle
Harold N. Barrett

Inventor:
Frank R. McBerty.
By George P. Barton
Attorney.

No. 771,920. PATENTED OCT. 11, 1904.
F. R. McBERTY.
COIN COLLECTOR.
APPLICATION FILED JAN. 23, 1903.
NO MODEL.
5 SHEETS—SHEET 3.
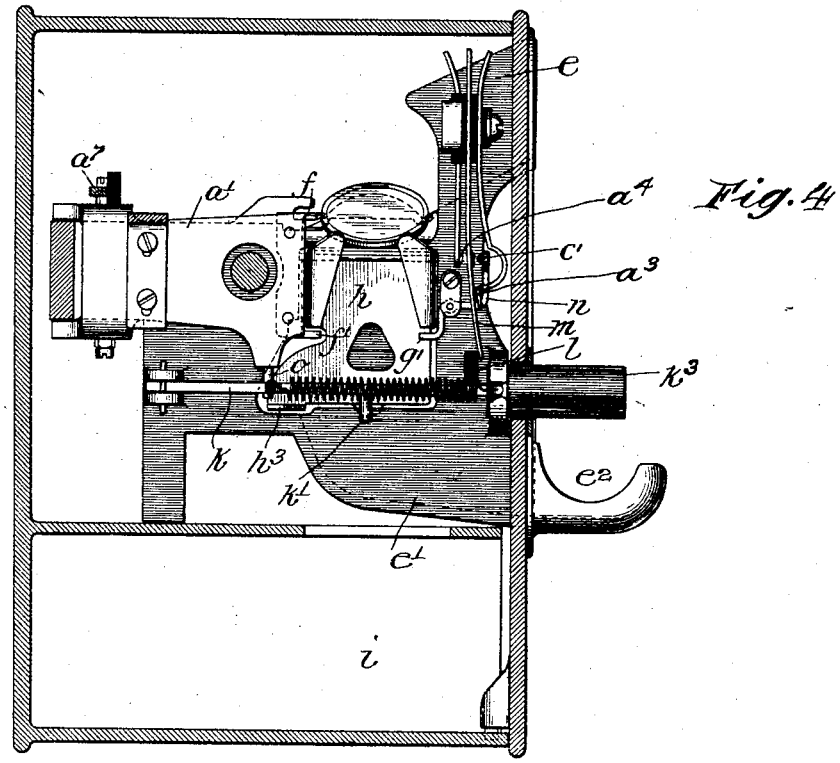
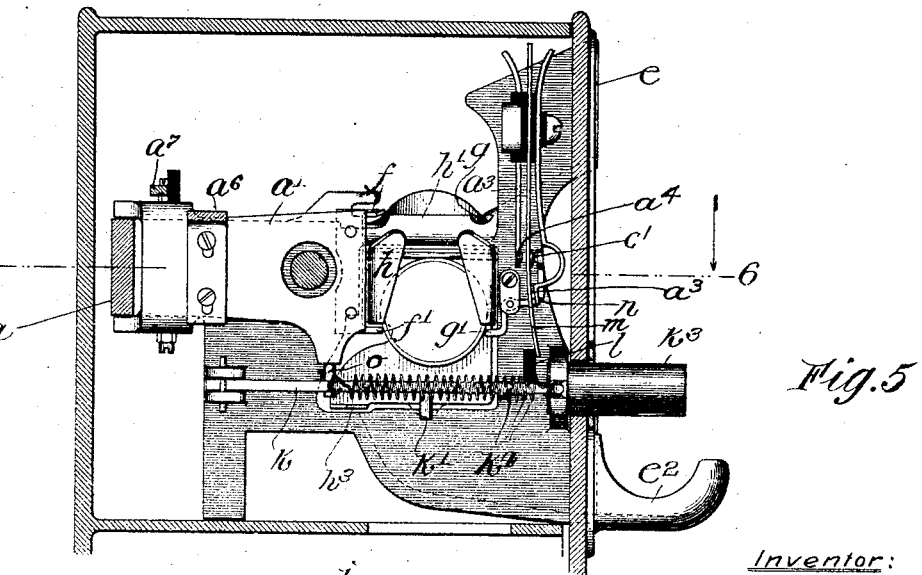
Witnesses:
Inventor:
Frank R. McBerty.
By George P. Barton
Attorney.

Inventor:
Frank R. McBerty,

Attorney.

No. 771,920. PATENTED OCT. 11, 1904.
F. R. McBERTY.
COIN COLLECTOR.
APPLICATION FILED JAN. 23, 1903.
NO MODEL. 5 SHEETS—SHEET 5.

Witnesses:
Inventor:
Frank R. McBerty,
By George P. Barton
Attorney.

No. 771,920. Patented October 11, 1904.

UNITED STATES PATENT OFFICE.

FRANK R. McBERTY, OF EVANSTON, ILLINOIS, ASSIGNOR TO WESTERN ELECTRIC COMPANY, OF CHICAGO, ILLINOIS, A CORPORATION OF ILLINOIS.

COIN-COLLECTOR.

SPECIFICATION forming part of Letters Patent No. 771,920, dated October 11, 1904.

Application filed January 23, 1903. Serial No. 140,267. (No model.)

*To all whom it may concern:*

Be it known that I, FRANK R. McBERTY, a citizen of the United States, residing at Evanston, in the county of Cook and State of Illinois, have invented a certain new and useful Improvement in Coin-Collectors, (Case No. 119,) of which the following is a full, clear, concise, and exact description.

My invention relates to a coin-collector or toll-box for use at the substations of telephone-exchanges, and has for its object to provide improved mechanism for receiving and handling coins deposited in payment for telephone service.

Certain telephone-exchange systems which are well known in the art are operated according to the following plan: The subscriber desiring an exchange connection sends in a call to the central office by removing his telephone-receiver from its switch-hook and making a preliminary or tentative deposit of a coin in the toll-box, the mechanism whereof is arranged to be controlled electrically from the central office. The deposited coin is held pending its final disposition in a temporary receiver, from which it may be discharged either into a cash-box or into a return-chute, which refunds it to the depositor. The operator is provided with means for controlling the application of special current to the line for the actuation of the toll-box mechanism, so that she may deposit the coin, as would ordinarily be proper, or refund it to the depositor under certain circumstances, as where the desired connection cannot be obtained.

My improved coin-collector was designed particularly for use in a system operating generally as above described, except that I prefer to have the refund of the coin brought about by mechanism to be actuated by the subscriber, while leaving the control of such mechanism primarily with the operator to prevent the fraudulent operation thereof.

One feature of the invention lies in novel means for transferring deposited coins of suitable size to the temporary receiver while rejecting undersized coins and passing them back to the subscriber.

Other features of the invention lie in the improved mechanism for controlling the final deposit of the coin in the cash-box or its return to the subscriber, together with various details of construction by which the mechanism of the box and the coin may coöperate to accomplish a number of desired results and overcome certain defects which have been inherent in devices of the same general character heretofore known.

Certain particularly-desired features of operation which are accomplished by my invention are as follows: Coins under the required size are immediately rejected and passed back to the depositor through the return-chute. If the coin is of the right size and the system is otherwise in operative condition, the coin will be transferred to a temporary receiver, where it is held until finally disposed of, and in the meantime if another coin is deposited while the first is undisposed of such other coin will be immediately refunded through the return-chute. A deposited coin will also be immediately refunded if the telephone-line is already in use at some other station, assuming it to be a party-line. If the circuit of the line is broken, so that the central office cannot be signaled, the coin may be recovered by the subscriber by pressing a button. The final deposit of the coin in the cash-box may be brought about by the operator pressing a key at the central office, or under proper circumstances the subscriber may recover the coin by pressing a button after the connection at the central office has been taken down, the premature or fraudulent recovery of the coin being, however, prevented.

I will describe my invention particularly by reference to the accompanying drawings, which illustrate the preferred embodiment thereof, and the features or combinations which I regard as novel will be pointed out in the appended claims.

Figure 3:
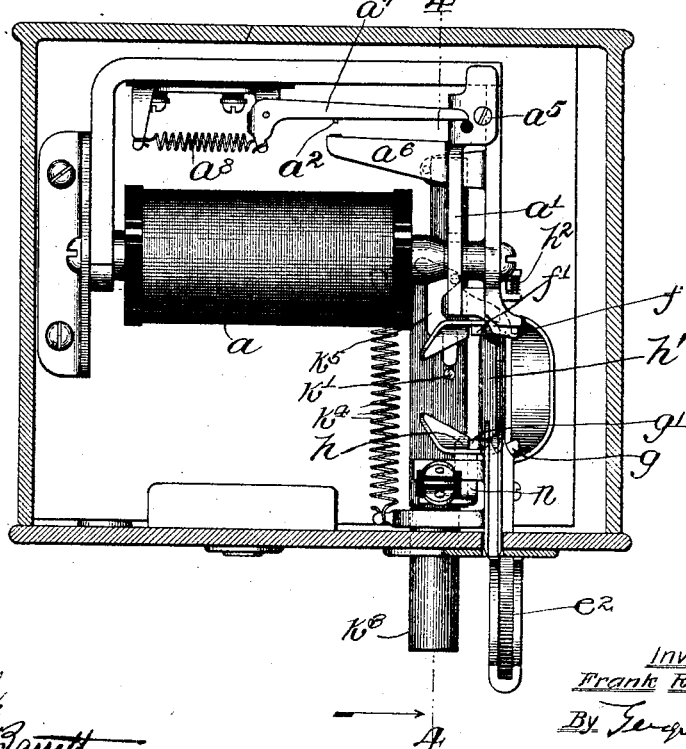
Figure 6:
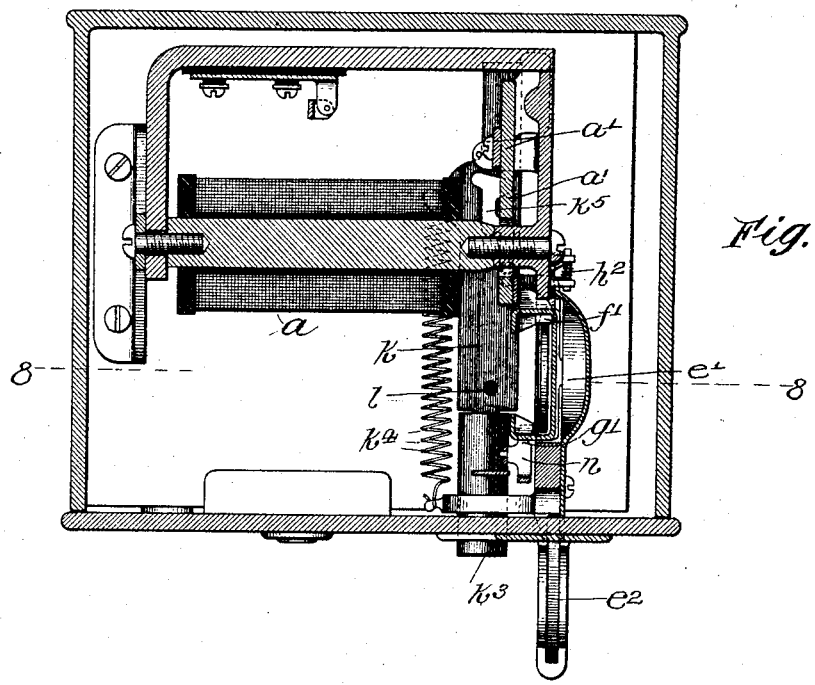
Figure 7:
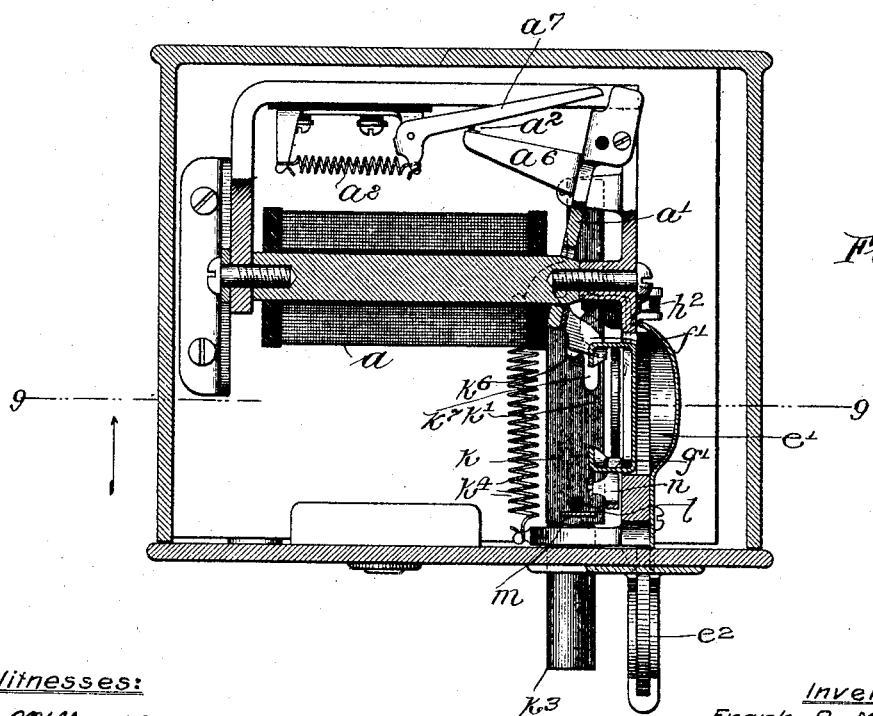
Figure 8:
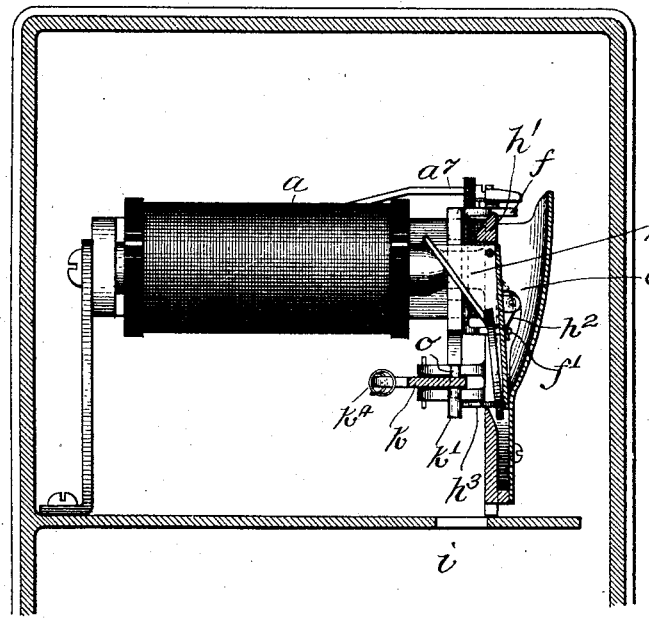
Figure 9:
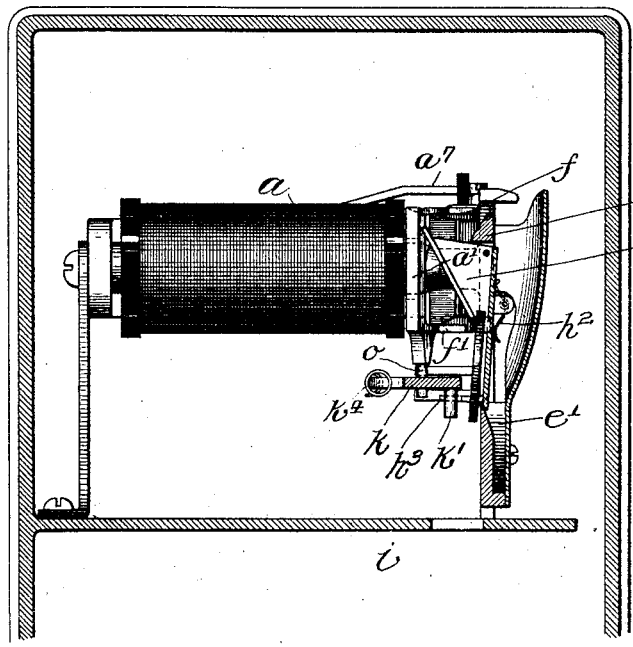

Figure 1 is a diagram illustrating the principal features of a telephone system of the kind with which my improved coin-collector is especially adapted to be used. Fig. 2 is a view of the coin-collector or toll-box in front elevation. Fig. 3 is a sectional plan view of the toll-box, showing the mechanism thereof in plan. Figs. 4 and 5 show the mechanism of the toll-box in sectional elevation. Fig. 6 is a sectional plan view on line 6 6 of Fig. 5, but showing the plunger pushed in to direct a deposited coin into the return-chute. Fig. 7 is a plan view, partially in section, showing the armature of the magnet attracted and the mechanism moved into position to release a coin from the temporary receiver and direct the same into the cash-box. Fig. 8 is a sectional elevation on line 8 8 of Fig. 6. Fig. 9 is a sectional elevation on line 9 9 of Fig. 7, and Fig. 10 is a detail view of the principal parts of the operating mechanism in perspective.

The same characters of reference are used to designate the same parts wherever they are shown.

Referring first to Fig. 1, it should be stated that the system therein shown forms no part of the present invention; but the novel features thereof are claimed in a separate application by myself and James L. McQuarrie, Serial No. 140,266, filed January 23, 1903. The present application is directed particularly toward the mechanism of the coin-collector, and the circuits are shown merely to illustrate how the electrical mechanism of the coin-collector is connected with the telephone-line.

The toll-box is associated with the telephone-line at the substation and is provided with an actuating-magnet $a$, which is connected in a grounded branch 3 from a bridge of the line conductors 1 2. Said bridge is controlled on one side of the magnet by the usual telephone switch-hook $c$, and on the other side by a contact $c'$, arranged to be actuated by a deposited coin. The armature $a'$ of the magnet $a$ is adapted when drawn up to close a relay-contact $a^2$, controlling a shunt 4 of the coin-actuated contact $c'$. Said shunt is also controlled at a normally closed contact $a^3$, associated with the refund mechanism, which last-mentioned contact is opened when the subscriber actuates said refund mechanism. The refund mechanism is also adapted in its actuation to close a normally open contact $a^4$, which will connect the magnet $a$ directly with the limb 2 of the line independent of the telephone-switch. At the central office the line conductor 2 is normally open, and the conductor 1 is connected through the contacts of a cut-off relay and the winding of a line-signal magnet with the free pole of a grounded battery $b$. When connection is made with the line at the central office by inserting the plug $d$ in the spring-jack $d'$, the cut-off relay is actuated in the usual manner to disconnect the central battery $b$ from the line, the battery $b'$ being at the same time applied in a bridge of the line through the connecting cord-circuit, the connection being such that the free pole of said battery is connected to the limb 2, while the grounded pole thereof is connected to the limb 1—that is, the connection is the reverse of the normal connection through the cut-off relay. A key $p$ is associated with the operator's plug-circuit, which is adapted when depressed to break the circuit of the tip-strand and connect the end thereof leading to the tip of the plug—that is, to the limb 1 of the telephone-line—with the free pole of a grounded generator G of special strong current. The magnet $a$ at the substation is of high resistance and impedance and is adapted to respond weakly to current from batteries $b$ $b'$, but will respond with considerably greater energy to current from the generator G.

While I have for convenience of illustration indicated two batteries in the drawings, it will be understood that in practice these may be one and the same battery.

I will now proceed to describe the mechanism of the toll-box, which forms the subject-matter of the present application. The receiving coin-chute $e$ has its mouth near the top of the front face of the box and leads rearwardly downward to the mechanism which separates proper coins from those which are undersized. Two stops $f$ $g$ are provided in the path of the falling coin and are at such a distance apart that coins of the required size cannot pass between them, and the coin-chute is continued below said stops as a return-chute $e'$, leading back to a return-cup $e^2$ at the front of the box. A temporary receiver $h$ in the form of a swinging guideway is provided alongside the return-chute, and a bar $h'$ forms the upper edge of the partition dividing said receiver from the return-chute, the lower portion of said partition being formed by the wall of the temporary receiver. The stops $f$ $g$ are placed so as to arrest the coin alongside the bar $h'$. The edges of said stops are preferably inclined, as shown, so that the coin will be supported at its outer edges only in such a way that it will tend to turn sidewise over the bar $h'$, and this tendency is increased by arranging the chute at a slight angle, so that the coin will already be tilted to one side when it strikes the stops. The center of gravity of the coin will therefore be displaced toward the receiver $h$, and the coin will turn sidewise over the bar $h'$ and fall into said receiver, where it will be held by stops $f'$ $g'$. One advantage of this peculiar arrangement for deflecting the coin laterally is that a string attached to the coin will interfere with the freedom of movement which is necessary to the normal operation. The "beating" of the device is therefore made more difficult. The stops $f$ $f'$ are carried at the top and bottom, respectively, of the armature $a'$ of the magnet $a$, said armature being pivoted at $a^5$, substantially in the plane of the receiver, to swing horizontally, moving the stops carried thereby across the edges of the chute and receiver. The armature-lever $a'$ is normally held in a retracted position by the end of a bell-crank lever $a^7$ pressing against an insulating-stud carried by said armature-lever near the fulcrum thereof. Said bell-crank lever is actuated by the spring $a^8$. The armature carries an arm $a^6$, which extends at right angles thereto toward the fulcrum of the spring-actuated lever $a^7$ in position to form an intermediate stop for the armature-lever when the latter is partially attracted. Contact parts are carried by the arms $a^6$ $a^7$ at their points of engagement to constitute the relay-contact, designated in the diagram as $a^2$. After the armature has reached its intermediate position the final step or movement in its attraction to the position shown in Fig. 7 is opposed by the considerably-increased resistance due to the change in the leverage by which the tension of spring $a^8$ is applied. The upper stop $f$, carried by the armature, is normally interposed in the coin-chute in position to deflect a deposited coin into the coin-receiver, but is withdrawn by the attraction of the armature through the first step. The lower stop $f'$ is normally interposed at the bottom of the temporary receiver $h$ in position to coöperate with the stop $g'$ to arrest a coin in said receiver, and said stop $f'$ is long enough to remain in the path of the coin whether the armature is in its normal position or has been moved to the intermediate position; but when the armature is completely attracted, as shown in Fig. 7, said lower stop $f'$ will be moved out of the path of the coin to permit the same to fall through into the cash-box $i$. The swinging receiver $h$ is normally maintained by the spring $h^2$ in the position shown in Fig. 9, so that when the armature of the magnet is fully attracted to remove the lower stop $f'$ from the path of the coin said coin will be directed into the cash-box. Means are provided, however, for swinging the receiver over to the position shown in Fig. 8, so that a coin will be directed therefrom into the return-chute. The lower stop $g'$ does not extend over far enough into the chute to support the coin in the receiver or guide when the same is shifted to the position shown in Fig. 8, so that the coin will thus be released, even though the other stop, $f'$, is not moved, the relation of the stops to the receiver being such that the coin will fall through unless it is supported by both of said stops. The shifting of the receiver to discharge the coin into the return-chute may be effected by a pin $k'$, carried by the plunger-bar $k$, engaging a beveled ear or cam-plate $h^3$, carried by the lower end of said swinging receiver. The bar $k$ is fitted with a push-button $k^3$, by which it may be reciprocated, said bar being normally maintained in the position shown in Figs. 3 and 4, for example, by the spring $k^4$. To prevent the plunger from being pushed in to throw a coin into the return-chute under improper circumstances, a locking-pin $o$ is carried by the armature and arranged to slide in a cam-groove $k^5$ in the plunger bar or plate $k$, said groove being formed so than when the magnet is attracted the plunger cannot be pushed clear in. It will be noted that the cam-groove is shaped so that in the initial movement of the plunger the armature $a'$ will be caused to move over to its attracted position in line with the projecting shoulder $k^6$, so that unless the armature is retracted to enter the pin $o$ in the extension $k^7$ of the slot the further inward movement of the plunger will be arrested before the pin $k'$ has engaged the cam-plate $h^3$ to shift the swinging receiver. The advantage of this is that a very weak attraction of the magnet will serve to lock the plunger, since the armature is moved over close to the pole-piece by the initial movement of said plunger. This prevents the subscriber from recovering his coin by a sudden movement of the plunger to throw over the swinging receiver before the magnet has had time to draw up its armature through the considerable distance necessary. The movement of the plunger $k$ may also serve to control the switch-contacts $a^3$ and $a^4$. An insulating-stud $l$ is carried by the plunger-plate and normally engages a contact-spring $m$, forcing the same into contact with a back-contact anvil $a^3$. When, however, the plunger is pushed in by the initial movement, the pressure of the stud $l$ against spring $m$ is removed and said spring by its own resiliency leaves the back contact $a^3$ and comes against the alternate contact $a^4$. A contact $c'$ should be arranged to be closed by the coin when the same is held in the temporary receiver $h$, and for this purpose the lower stop $g'$, upon which the coin rests in the temporary receiver, may be formed by the lower end of a pivoted lever $n$, the upper end whereof carries the contact-point $c'$. When the coin is in the receiver, its weight swings the lever $n$ upon its pivot and brings the contact-point $c'$ into engagement with a corresponding contact on the switch-spring $m$. When said switch-spring takes its alternate position, as the plunger is pushed in, it is separated from this contact $c'$ as well as from contact $a^3$.

The operation of the device is as follows: The subscriber desiring to transmit a call to the central office takes his telephone from its switch-hook $c$ and deposits a coin in the coin-chute $e$. If the line is already busy at some other station, the magnet $a$ will be excited by current from either the battery $b$ or the battery $b'$ at the central office, so that the armature thereof will be drawn up and the stops removed from the path of the coin. The coin will therefore be immediately returned through the chute $e'$ to the return-cup $e^2$. Ordinarily, however, the magnet will not be excited and the coin will strike the stops $f$ $g$ and fall sidewise over the bar $h'$ into the temporary receiver $h$, as before described and as shown in Fig. 5. In Fig. 4 the coin is shown in the act of turning sidewise over the bar $h'$. If a coin smaller than that for which the instrument is designed is deposited in the chute, it will simply fall through between the stops $f g$ and into the return-chute instead of turning sidewise over the bar $h'$, as a proper coin will do. Assuming the coin to be a proper one and that it has turned over and come to rest in the temporary receiver, it will there bring about the closure of the contact $c'$, as before described. This will close circuit from conductor 1 (to which battery is applied at the central office) to earth through conductor 3, which includes the winding of magnet $a$. The magnet will then be excited and draw up its armature to the intermediate position. Three results are accomplished by drawing up the armature: First, the stops $f f'$, carried by the armature, are removed from the coin-chute, so that coins subsequently deposited will simply pass through the chute and be returned; second, the relay-contact $a^2$ will be closed to close shunt 4 and maintain the circuit through the magnet independent of the coin-actuated contact $c'$, and, third, the pin or stop $o$, carried by the arm $a'$, will be moved into the path of the shoulder $k^6$ of the plunger-bar, so that if the magnet continues excited the plunger cannot be pushed clear in to recover the coin. Until the operator answers, however, the supply of current to magnet $a$ can be cut off at contacts $a^3$ and $c'$ by the initial inward movement of the plunger, so that in case the subscriber does not receive attention he can recover his coin by slowly pushing in the plunger. When the operator plugs in, the subscriber loses control of the coin, since battery $b'$ is now applied to limb 2 of the telephone-line, and the initial inward movement of the plunger will connect the magnet $a$ direct with this limb 2 at contact $a^4$, so that the magnet will remain excited to lock the refunding mechanism. The final disposition of the coin held in the temporary receiver may be either by the operator causing said coin to be deposited in the cash-box or permitting the subscriber to recover it in case no charge is to be made, as where the connection called for cannot be obtained. If the coin is to be deposited, the operator will apply special strong current from the generator G by depressing her key $p$. This will cause the magnet to become so strongly excited that it will completely draw up its armature against the tension of spring $a^8$, as shown in Fig. 7. This will withdraw the lower stop $f'$, permitting the coin to fall into the cash-box. If the coin is to be returned, the operator will tell the subscriber to wait a moment and to then push the button. She will then take down the connection—that is, remove her plug $d$ from the spring-jack $d'$—after which the subscriber by pressing the button may break the circuit of the magnet $a$ at contact $a^3$, causing its deënergization and as the plunger moves in causing the receiver $h$ to be shifted into the position shown in Fig. 8, whereby the coin is released and discharged into the return-chute.

When the subscriber whose station is equipped with the coin-collector of my invention is the called instead of the calling party, the insertion by the operator of the connecting cord-plug in a jack of his line disconnects the central battery from limb 1, with which it is normally connected, and applies it through the cord-circuit to limb 2. Thus when the subscriber in response to the calling-signal takes his receiver from switch-hook $c$ magnet $a$ is immediately actuated to complete the telephone-circuit without requiring the deposit of a coin.

The device as shown in the drawings has many advantages, which will be at once apparent to those skilled in the art. It is extremely compact, and the mechanism, considering the many conditions to be fulfilled, is quite simple and not likely to get out of order. The several parts of the mechanism which are immediately concerned in the handling of the coin are all arranged close to the plane of the coin-chute and substantially parallel therewith, the only parts which project laterally any great distance being the magnet and its extended pole-piece, which also serves as a supporting-frame for the lever mechanism controlling the step-by-step movement of its armature.

Having thus described my invention, I claim—

1. In a coin-collector, the combination with the coin-chute, of stops interposed to engage the edges of a falling coin of a given size, said stops being constructed and arranged to support the coin at one side of its center of gravity, whereby it is caused to turn over sidewise and so be transferred or deflected laterally.

2. In a coin-collector, the combination with the receiving coin-chute, of a temporary coin-receiver disposed to one side thereof, the chute being continued as a return-chute, stops constructed and arranged to support a coin at one side of its center of gravity, interposed in the path of coins falling through the chute, above the temporary receiver, whereby coins of suitable size are turned over sidewise into the temporary receiver, said stops being separated to allow smaller coins to pass on through the return-chute.

3. In a coin-collector, the combination with a coin-chute, of stops interposed in position to engage the edges of a coin falling from said chute, the edges of said stops being inclined toward one another, whereby the coin is supported at the edge of the rim, to one side of the center of gravity, and caused to turn over sidewise and so be transferred laterally, the stops being separated to allow smaller coins to pass on between them in the direct path.

4. In a toll-box, the combination with a receiving coin-chute, of a temporary coin-receiver, stops interposed in said receiving coin-chute, said stops being constructed to support a coin at one side of its center of gravity and transfer the same laterally into said temporary coin-receiver, electromagnetic mechanism controllable from a distant point arranged to discharge a coin from the receiver within the box, a return-chute and mechanism arranged for actuation by the subscriber, adapted to discharge a coin from the receiver into said return-chute.

5. In a toll-box, the combination with a coin-chute, of a temporary coin-receiver, a manually-operated refunding mechanism, a magnet having an armature adjusted for two movements according to the current applied to said magnet, a lock for the refunding mechanism set in one movement of the armature, and means for discharging the coin from the receiver operated in the other movement of the armature.

6. In a coin-collector, the combination with the receiving-chute, of a temporary coin-receiver, a normally interposed stop arranged to deflect a coin from the chute into said temporary receiver, means adapted to be controlled by a coin in the receiver, for withdrawing said stop, and a return-chute below the stop, whereby coins deposited in the receiving-chute while a previously-deposited coin is undisposed of will be returned.

7. In a toll-box, the combination with the receiving-chute, of a temporary coin-receiver, a normally interposed stop arranged to deflect a coin from the chute into said temporary receiver, a return-chute, manually-operated refunding mechanism adapted to discharge a coin from said temporary receiver into said return-chute, an electromagnet, an armature therefor arranged for two movements according to the current applied to the electromagnet, said armature being arranged to withdraw the aforesaid deflecting-stop and lock the refunding mechanism upon one movement of its operation, and to effect the discharge of the coin from the temporary receiver into a permanent receptacle upon another movement of its operation.

8. The combination with a receiving coin-chute, of a temporary coin-receiver at one side of said chute forming a movable side wall therefor, means for deflecting a deposited coin into the temporary receiver, alternative channels leading from said receiver, one to the cash-box, the other to the return-chute, two stops normally blocking said channels, electromagnetic mechanism for withdrawing one of said stops to open the channel to the cash-box, and alternative refunding mechanism for withdrawing the stop in the channel leading to the return-chute.

9. The combination with a receiving coin-chute and a return continuation thereof in substantially the same vertical plane, of a pivoted temporary coin-receiver forming a movable side wall of the coin-chute, a magnet and an armature-lever therefor carrying upper and lower stops $f$ $f'$ and pivoted to swing said stops laterally across the edges of the chute and the temporary receiver, said armature-lever being arranged to move toward its magnet in two steps according to the strength of the magnet, the upper tops $f$ being normally interposed above the receiver in position to deflect a deposited coin laterally into said receiver and being withdrawn by the first step of the armature movement, and the lower stop being interposed at the edge of the receiver in both the normal and intermediate positions of the armature-lever, but being withdrawn when the armature is fully attracted, a stop $g'$ opposite the stop $f'$ to coöperate therewith in holding a coin in the receiver, a contact adapted to be closed by a coin in the receiver, a plunger-bar sliding alongside the coin-receiver, means controlled by the plunger in its movement for shifting the coin-receiver beyond the stop $g'$ into the return-chute, and a pin carried by the armature-lever adapted to engage said plunger to lock the same when the armature is attracted.

10. In a toll-box, the combination with a receiving coin-chute and the return continuation thereof in substantially the same vertical plane, of a shifting temporary coin-receiver at one side of the chute and having a wall in common with said chute, a magnet armature-lever pivoted substantially in the line of the receiver and chute at the rear thereof, upper and lower stops $f$ $f'$ carried by said lever, normally projecting laterally across the rear edges of the chute and receiver, said armature-lever being arranged to swing horizontally through two steps or movements, the first step withdrawing the upper stop from the chute and the second step withdrawing the lower stop from the receiver, a stop $g'$ coöperating with the lower stop $f'$ to arrest a coin in the receiver, a sliding plunger adapted in its movement to shift the receiver into the return-chute beyond the stop $g'$ to discharge a coin into said return-chute, a contact adapted to be closed by a coin in the receiver, a contact closed by the armature-lever when attracted the first step, and maintained when the armature moves the second step, switch-contacts changed in the initial movement of the plunger, a pin carried by the armature-lever engaging a cam-groove in the plunger to lock said plunger when the armature is attracted, said cam-groove being adapted to coöperate with said pin to move the armature-lever toward the magnet-pole in the initial movement of the plunger.

11. In a toll-box, the combination with a temporary coin-receiver, of manually-operated refunding mechanism, an electromagnet, an armature therefor, a lock for the refunding mechanism made effective by the armature while in its attracted position, and means actuated in the initial operation of the refunding mechanism for temporarily moving the armature toward the magnet-pole to lock said refunding mechanism.

12. The combination with a temporary coin-receiver, of a plunger, a refunding mechanism and a switch-contact operated in the movement of said plunger, an electromagnet controlled by said switch-contact, an armature for said magnet, a lock arranged to prevent the operation of the refunding mechanism, made effective by the armature in its attracted position, means for yieldingly maintaining the armature retracted, and a cam mechanism actuated in the initial movement of the plunger, arranged to move the armature toward the magnet, whereby the lock is made effective by a weak excitement of the magnet, substantially as set forth.

13. The combination with an electromagnet, of a pivoted armature therefor, a spring-actuated pivoted lever $a^7$ bearing at its outer end against a part carried by the armature near the fulcrum thereof, and an extension $a^6$ carried by the armature in position to engage the lever $a^7$ nearer its fulcrum when the armature is partially attracted, forming an intermediate stop for the armature, further attraction of the armature being opposed by a considerably greater resistance, whereby the armature may be moved step by step according to the strength of the current applied to the magnet.

14. In a toll-box, the combination with the temporary coin-receiver, of a magnet $a$, an armature-lever $a'$ therefor and coin-distributing mechanism controlled thereby, a spring-actuated lever $a^7$ bearing at its outer end against a stud carried by the armature-lever near the pivotal axis thereof, an arm $a^6$ carried by the armature-lever extending toward the pivot of the lever $a^7$ and arranged to strike the latter near its fulcrum when the armature is partially attracted, to form an intermediate stop for the armature under a weak excitation of the magnet, and contact parts at the point of engagement of said arm $a^6$ and lever $a^7$ adapted to control an electric circuit.

15. In a coin-collector, the combination with the receiving coin-chute and a return continuation thereof, of a temporary coin-receiver, a magnet and mechanism operated thereby controlling the transfer of a deposited coin from the chute to the temporary receiver, and a contact device adapted to control a circuit of said magnet, arranged to be actuated by a coin in the receiver.

16. In a coin-collector, the combination with a coin-chute leading through said coin-collector to the outside thereof, of a coin-receiver, a stop normally interposed in said coin-chute adapted to transfer a deposited coin into the receiver, and a magnet for withdrawing said stop to permit a deposited coin to pass through the coin-collector and be returned to the depositor.

17. In a coin-collector, the combination with a temporary coin-receiver, of a cash-box, mechanism for transferring a coin held in said receiver into said cash-box, manually-operated refund mechanism for returning the coin to the depositor, a lock adapted to prevent the operation of said refund mechanism, and a magnet controlling said lock.

18. In a coin-collector the combination with a coin-chute, of a temporary coin-receiver, a stop normally interposed in the chute adapted to transfer a deposited coin into the temporary receiver, refund mechanism, a blocking device therefor, and a magnet as described, said stop and said blocking device being controlled by the magnet.

19. In a coin-collector, the combination with a coin-chute, of a temporary coin-receiver, a stop normally interposed in the chute for transferring a deposited coin therefrom into said receiver, a cash-box, deposit mechanism for transferring the coin from the temporary receiver to the cash-box, refund mechanism for transferring the coin from said receiver to the depositor, a blocking device for said refund mechanism, and a magnet adapted in its operation to withdraw said stop, and to actuate said blocking mechanism and said deposit mechanism.

In witness whereof I hereunto subscribe my name this 29th day of November, A. D. 1902.

FRANK R. McBERTY.

Witnesses:
ADELL HOCKETT,
JULIA K. MUNROE.